United States Patent [19]

Ajimi

[11] Patent Number: 5,035,550
[45] Date of Patent: Jul. 30, 1991

[54] HOLE SAW

[75] Inventor: Kunio Ajimi, Higashiosaka, Japan

[73] Assignee: House B. M. Co., Ltd., Highashiosaka, Japan

[21] Appl. No.: 587,404

[22] Filed: Sep. 25, 1990

[30] Foreign Application Priority Data

Oct. 11, 1989 [JP] Japan .............................. 1-118851[U]

[51] Int. Cl.⁵ ............................................. B23B 51/04
[52] U.S. Cl. .................................................. 408/204
[58] Field of Search ............ 408/204, 205, 206, 203.5, 408/713, 68, 208, 209, 226

[56] References Cited

U.S. PATENT DOCUMENTS

| 3,758,221 | 9/1973 | Meshulam et al. | 408/204 |
| 3,973,862 | 8/1976 | Segal | 408/204 |
| 4,148,593 | 4/1979 | Clark | 408/204 |
| 4,669,928 | 6/1987 | Mediavilla | 408/68 |
| 4,968,189 | 11/1990 | Pidgeon | 408/209 |

FOREIGN PATENT DOCUMENTS

| 959857 | 10/1949 | France | 408/204 |
| 2607742 | 6/1988 | France | 408/204 |
| 55-169309/80 | 12/1980 | Japan . | |
| 1433650 | 10/1988 | U.S.S.R. | 408/204 |

Primary Examiner—William Briggs

[57] ABSTRACT

A shank 1 has, at the front end of its drive shaft 2, a drive collar 3 formed substantially integrally with the drive shaft 2. The drive collar 3 is formed, centrally of its front side, with a boss 4 projecting therefrom, and has a bolt receiving through-hole 7 bored therein at a position spaced apart from the boss 4 and in parallel relation to the axis of the shank 1. The base 16 of a hole saw body 15 has a center hole 18 bored in a center portion thereof for engagement with the boss 4, and also has at least one threaded hole 20 bored at a position spaced apart from the center hole 18. A bolt 6 for thread engagement with the threaded hole 20 of the base 16 of the hole saw body 15 is received in the bolt receiving through-hole 7 of the drive collar 3 in order to lock the hole saw body 15 to the drive collar 3 and to transmit drive torque to the hole saw body 15.

8 Claims, 4 Drawing Sheets

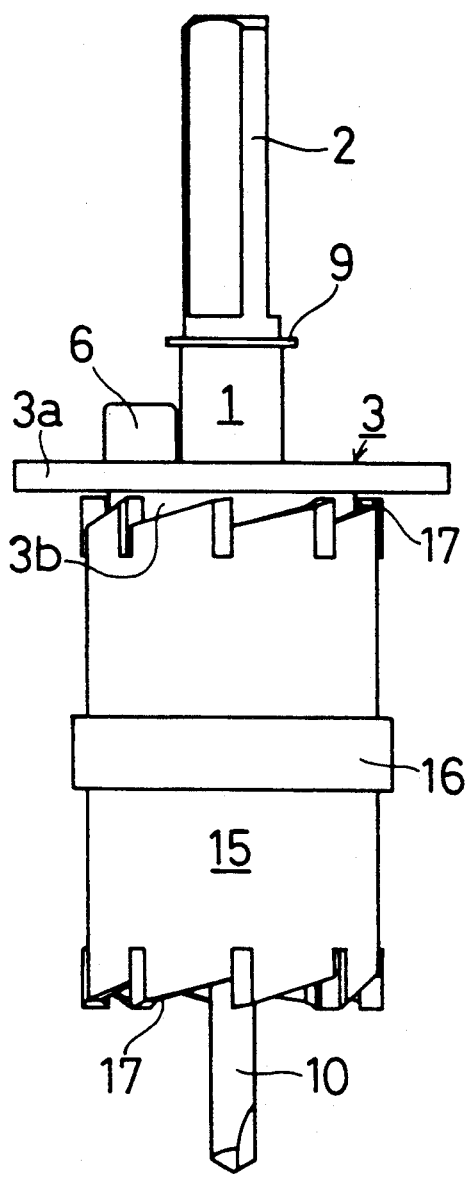
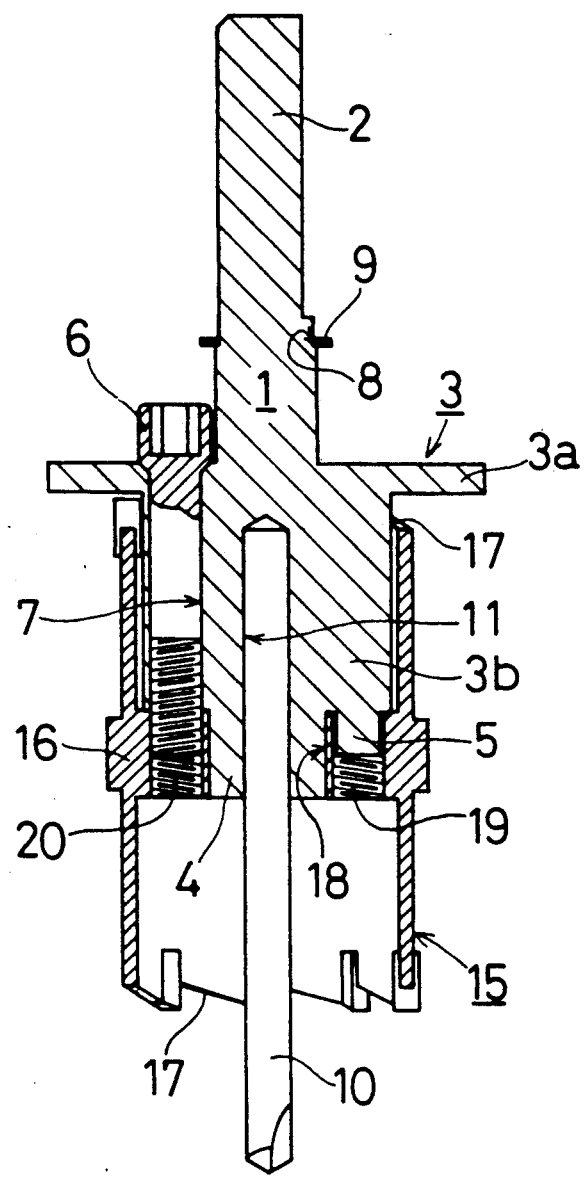

HOLE SAW

BACKGROUND OF THE INVENTION

1. Industrial Field of the Invention

This invention relates to a hole saw for use in cutting out holes of comparatively large diameters.

2. Prior Art

There are known hole saws of the type having a hole saw body and a shank for removably mounting the hole saw body to the tool mounting portion (main shaft portion) of a portable electric drill, with the hole saw body and shank being integrally fixed to each other. Such known hole saws are very uneconomical in the case of the saw tooth portion being worn away or damaged, because the entire hole saw including the shank must be replaced.

Also known in the art is a hole saw of the type comprising a threaded portion formed at the front end of the shank and a threaded hole formed in a base crossing the cylinder of the hole saw body, whereby the hole saw body can be removably mounted to the shank by bringing the threaded hole of the hole saw body into thread engagement with the threaded portion of the shank (as described in, for example, Japanese Utility Model Application Laid-Open Publication No. 55 - 169309).

Such a hole saw construction involves a drawback that since the means for removably mounting the hole saw body to the shank take the form of thread engagement between the two elements, an attempt to replace the hole saw body with another one after the hole saw has been operated is likely to encounter a difficulty such that, because of the rotation torque of the shank and reaction force of the hole saw body against the torque during the operation, the threaded portions of the shank and hole saw body have become so tightly engaged that it is very difficult to turn back the threaded portions. This means considerable inconvenience and danger is involved in replacing the hole saw body.

As a typical example of state-of-the-art arrangement which has solved such a problem, a hole saw of the following type is found among presently commercially available hole saws (see FIGS. 9 and 10). This hole saw 43 has a threaded portion 32 formed on a shank 31 at the front end thereof, and a threaded hole 35 formed in a base 34 crossing the axis of a hole saw body 33. A stopper 38, consisting of a disc 36 having a hole for receiving the shank 31 and a pair of pins 37 projecting from the disc 36, is fitted on the shank 31 side of the hole saw 43. The pins 37 are received in guide grooves 40 formed in a large-diameter portion 39 of the shank 31 so that the stopper 38 is supported non-rotatably relative to the shank 31 but slidably in the axial direction of the shank. Further, a nut 41 for locking the stopper 38 at its advanced position at which the stopper 38 contacts the large-diameter portion is threadably mounted on the shank 31 of the hole saw 43, and holes 42 for receiving the pins 37 of the stopper 38 are bored in the base 34 of the hole saw body 33.

Therefore, this hole saw 43 is such that, when the hole saw body 33 is brought in thread engagement with the shank 31, if the pins 37 of the stopper positionally coincide with the holes 42, the stopper 38 is advanced until the pins 37 are satisfactorily received into the holes 42, and if positional coincidence is not reached, the hole saw body 33 is screwed back until positional coincidence is reached and then the stopper 38 is advanced for insertion of the pins 37 into the holes 42. Through such process the hole saw body 33 can be non-rotatably mounted in position relative to the shank 31, and the nut 41 serves to prevent slip-off of the pins, 37.

Problems Sought to be Solved by the Invention

However, the above mentioned hole saw 43 still presents the following problems.

With this prior-art hole saw 43, it would be extremely fortunate if the pin holes 42 could positionally coincide with the pins 37 when the hole saw body 33 is securely screwed onto the threaded portion 32 of the shank 31. In fact, however, the probability of such coincidence is almost nil or as low as 1 to 2%. In most cases, the pins 37 cannot be brought in positional coincidence with the pin holes 42 unless the hole saw body 33 is screwed back some degree (e. g. 1° to 179 °). Therefore, it is inevitable that some clearance is produced between the threaded hole 35 of the screwed-back hole saw body 33 and the threaded portion 32 of the shank 31 brought in thread engagement therewith. Some clearance is also produced between each pin 37 and the corresponding pin hole 42. As a result, between the shank 31 and the hole saw body 33 mounted thereon there is likely to be produced some looseness such that the axis of the hole saw body 33 is subject to some wobbling relative to the axis of the shank 31. In addition, some looseness is likely to be produced between the shank 31 and the hole saw body 33 in the direction of rotation of the latter. In particular, the first mentioned looseness involving the wobbling trouble is a cause of deflection with respect to the cutting trajectory of the hole saw body 33. Therefore, where an ultrahard chip, such as ceramic chip or diamond, is used for the cutting tool, such looseness can easily damage the chip.

SUMMARY OF THE INVENTION

Object of the Invention

Accordingly, it is a primary object of the invention to provide a hole saw which eliminates all the foregoing problems with the prior art.

Means for Solving the Problems

In order to accomplish the above mentioned object, according to the invention there is provided a hole saw including in combination a shank having a drive collar at the front end of a drive shaft, a hole saw body having a base perpendicular to the axis thereof, and mounting means for removably attaching the base of the hole saw body to the drive collar of the shank. The hole saw comprises:

a. said drive collar of the shank being formed substantially integrally with the drive shaft;
b. a cylindrical boss projecting from the front side of the drive collar and coaxial with the shank, the drive collar having a bolt receiving through-hole bored therein at a position radially spaced from the boss which is parallel to the axis of the shank;
c. a bolt received in the bolt receiving throughhole, having a length such that a threaded portion of the bolt projects beyond the front side of the drive collar when the bolt is inserted into the bolt receiving through-hole until its head engages the rear side of the drive collar;
d. the base of the hole saw body having a center hole bored centrally therein for receiving the boss projecting from the front side of the drive collar, the base further having at least one threaded hole bored therein at a position radially spaced from the center hole for receiving the threaded portion of the bolt extending through the bolt receiving through-hole;

e. whereby, when the center hole in the base of the hole saw body is engaged by the boss projecting from the front side of the drive collar and when the threaded portion of the bolt received in the bolt receiving through-hole of the drive collar is brought in thread engagement with the threaded hole in the base of the hole saw body, the base of the hole saw body goes in close contact with the front side of the drive collar so that the hole saw body can be firmly retained in position by the drive, collar.

Function

The shank constituting one feature of the hole saw according to the invention comprises the above mentioned drive collar formed at the front end of the drive shaft, with the drive collar having the above mentioned boss projecting therefrom, and the drive collar also having a bolt receiving through-hole bored therein. The hole saw body constituting another feature of the hole saw according to the invention comprises a center hole for receiving the boss which is formed in the base having a plane perpendicular to the axis of the hole saw body, and threaded hole formed in the base for thread engagement with the bolt. Therefore, the hole saw of the invention permits the boss of the drive collar to be received in the center hole formed in the hole saw body even when the drive shaft of the shank is kept mounted to the tool mounting portion of a portable electric drill. The bolt received in the bolt receiving through-hole is then screwed into the threaded hole formed in the hole saw body, so that the base of the hole saw body is brought in close contact with the front end of the drive collar. In this condition, the hole saw body can be mounted to the shank. The hole saw body can be removed from the shank simply by screwing back the bolt.

BRIEF DESCRIPTION OF THE DRAWINGS

FIG. 1 is a front view of hole saw embodying the invention;

FIG. 2 is a longitudinal sectional front view thereof;

DESCRIPTION OF THE PREFERRED EMBODIMENTS

Embodiment 1

Figure 3:
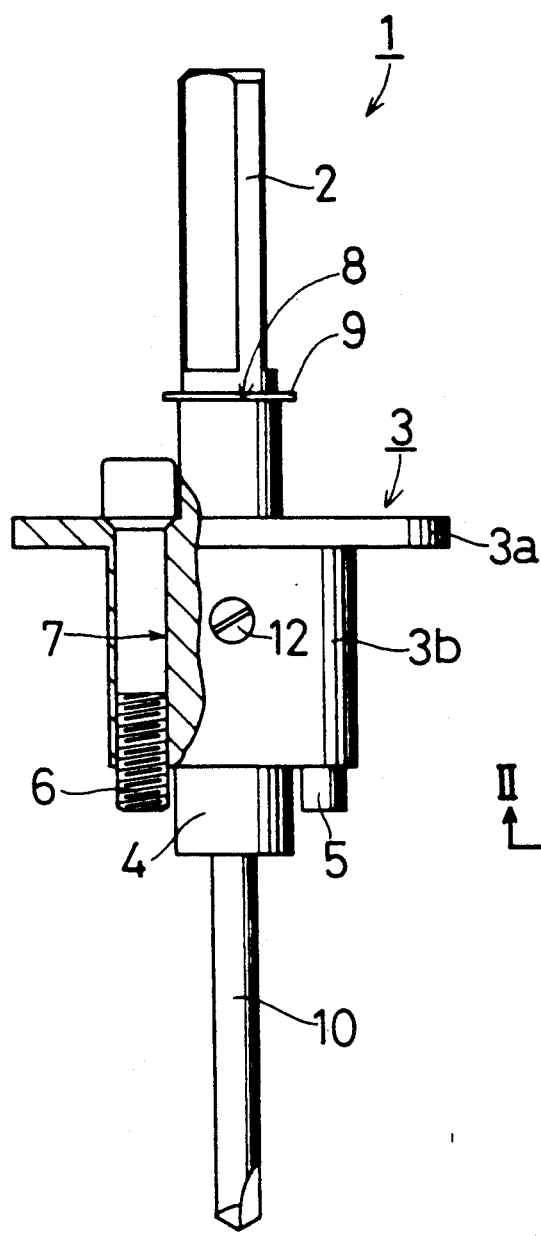
FIG. 3 is a front view, partially in longitudinal section, of a shank.
Figure 4:
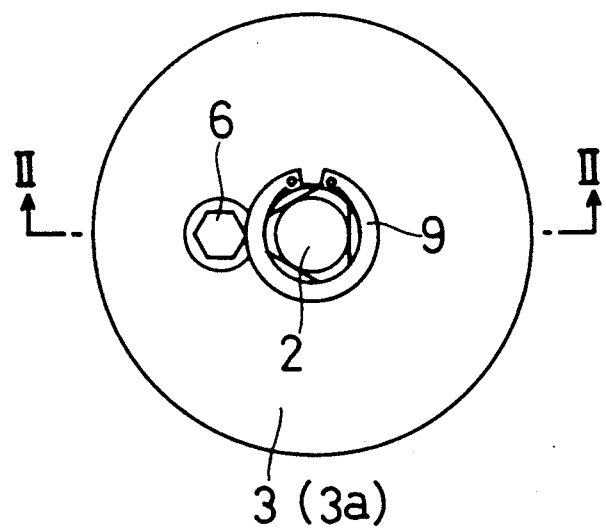
FIG. 4 is a plan view thereof.

One embodiment will now be described with reference to FIGS. 1 through 7. In FIGS. 1 to 4, numeral 1 designates a shank having a drive shaft 2 removably mountable to the tool mounting portion of a portable electric drill not shown. The shank 1 in this embodiment has a stepped drive collar 3 formed at the front end of the drive shaft 2 which consists of a large-diameter disc-shaped portion 3a and a smaller-diameter cylindrical portion 3b. A cylindrical boss 4 projects centrally from the front end of the front-side smaller-diameter cylindrical portion 3b, and one pin 5 projects therefrom at an off-center position. The shank 1 is formed with a bolt receiving through-hole 7 at a location 180° different in phase from the position of the pin 5 of the drive collar 3 (i. e. at a point symmetrical about the axis of the shank with the location of the pin 5), in which through-hole 7 is housed a bolt 6 having a length such that a threaded portion of the bolt 6 projects beyond the front end of the drive collar 3 when the bolt extends through the drive collar. The bolt 6 is prevented from slipping off by means of a stop ring 9 mounted in a stepped portion 8 formed on the drive shaft 2 at a suitable location. Shown at 10 is a center drill fitted at its base portion in a hole 11 bored in the cylindrical portion 3b of the drive collar 3 which extends axially through the center of the boss 4. Designated by 12 is a locking push screw for the drill.

Figure 5:
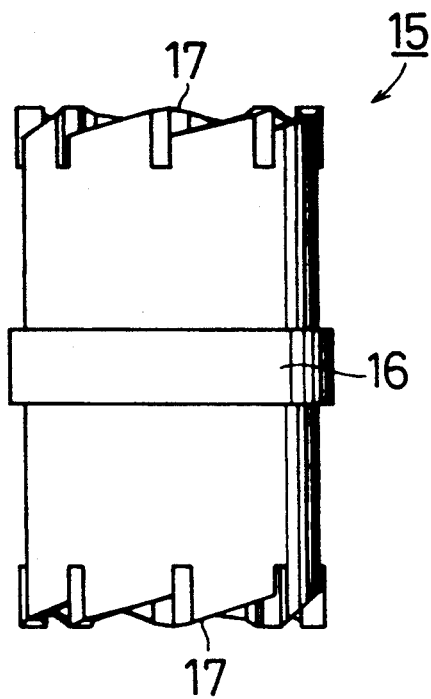
FIG. 5 is a front view of a hole saw body.
Figure 7:
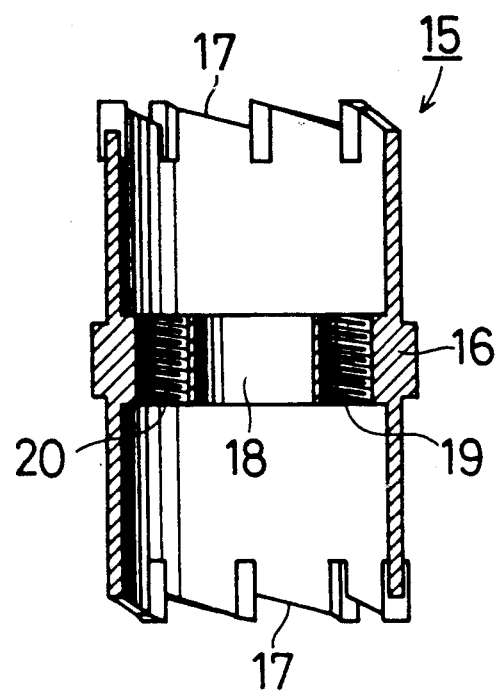
FIG. 7 is a longitudinal sectional front view thereof.
Figure 6:
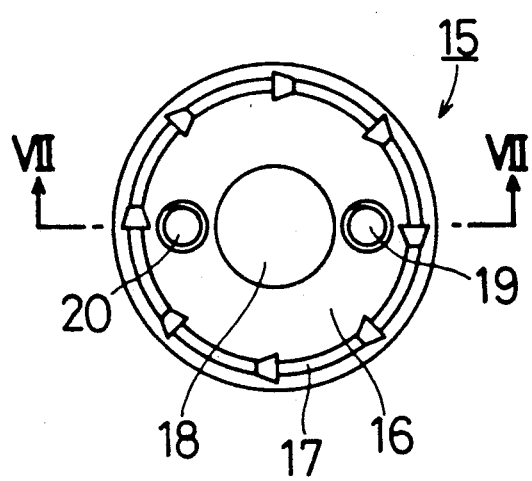
FIG. 6 is a plan view thereof.
Figure 10:
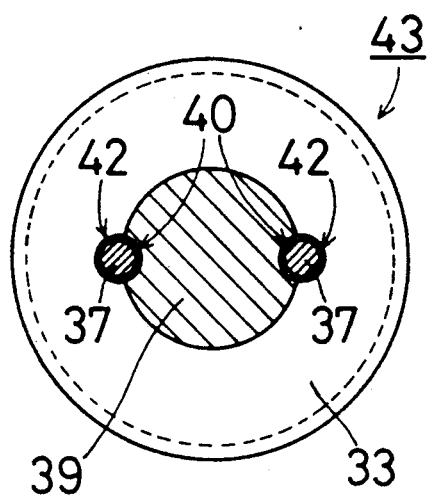
FIG. 10 is a section taken on line X—X in FIG. 9.

In FIGS. 1, 5, and 6, numeral 15 designates a double-edged hole saw body having a disc-shaped base 16. The hole saw body 15 is equipped at opposite sides of the base 16 with cylindrical saw teeth 17 projecting from the vicinity of outer circumferential edges of the base. A center hole 18 is formed centrally base 16 the hole saw body 15 for receiving the cylindrical boss 4 projecting from the drive collar 3 of the shank 1. Further, the base 16 is formed with a hole for receiving the pin 5 projecting from the drive collar 3 of the shank 1 and also with a threaded hole 20 for thread engagement with the threaded portion of the bolt 6 which is received in the bolt receiving through-hole 7 of the drive collar 3. In the present embodiment, the hole 19 is formed as a threaded hole of same diameter as the threaded hole 20, and the two threaded holes 19, 20 are provided at positions symmetrical about the center hole 18. Therefore, the pin 5 is engageable with either one of the threaded holes 19, 20.

The hole saw of this embodiment in which the shank 1 and the hole saw body 15 are constructed as above described is such that, as earlier described as to its function, the center hole 18 and threaded hole 19 (or 20) bored in the hole saw body 15 to be mounted to the shank 1 can be caused to receive therein the boss 4 and pin 5 of the shank 1 respectively when the drive shaft 2 of the shank 1 is kept mounted to a tool mounting portion (not shown) of a portable electric drill. Then the bolt 6 received in the bolt receiving through-hole 7 of drive collar 3 of the shank 1 is screwed into the threaded hole 20 (or 19) provided in the base 16 of the hole saw body 15, whereby the base 16 of the hole saw body 15 is pressed against the front face of the drive collar 3 of the shank 1 Therefore, the hole saw body 15 can be securely mounted to the shank 1 without any looseness being produced between them (FIGS. 1 and 2).

The hole saw body 15 as mounted to the shank 1 in the manner as above described can readily be removed from the shank 1 by screwing back the bolt 6.

Other Embodiments

Figure 8:
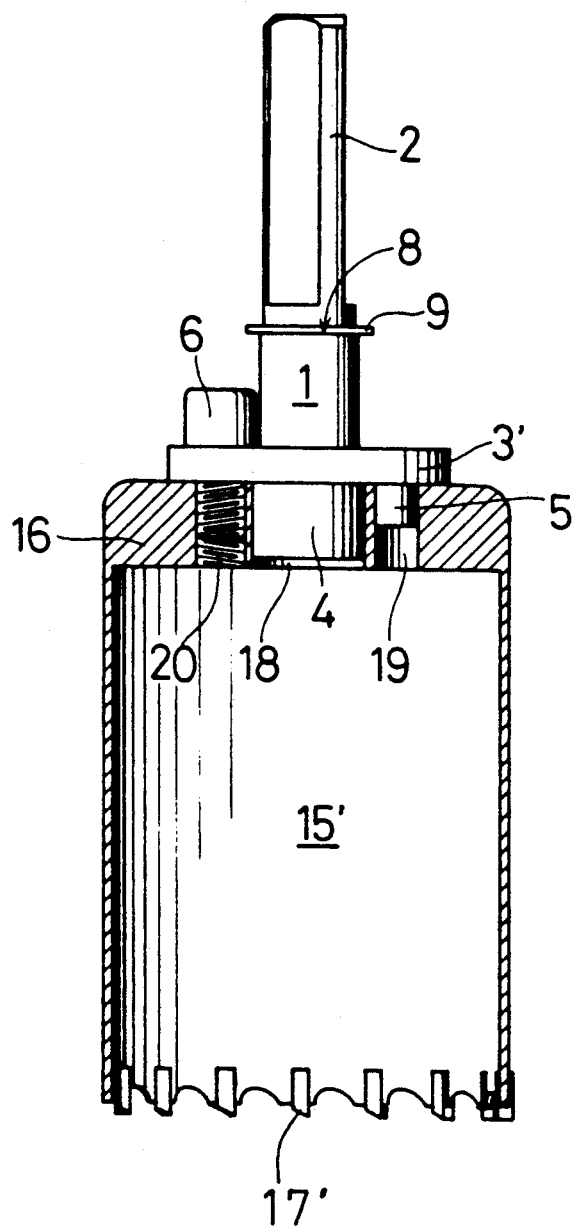
FIG. 8 is a front view of a hole saw in another embodiment, with hole saw body portion only shown in longitudinal section.
Figure 9:
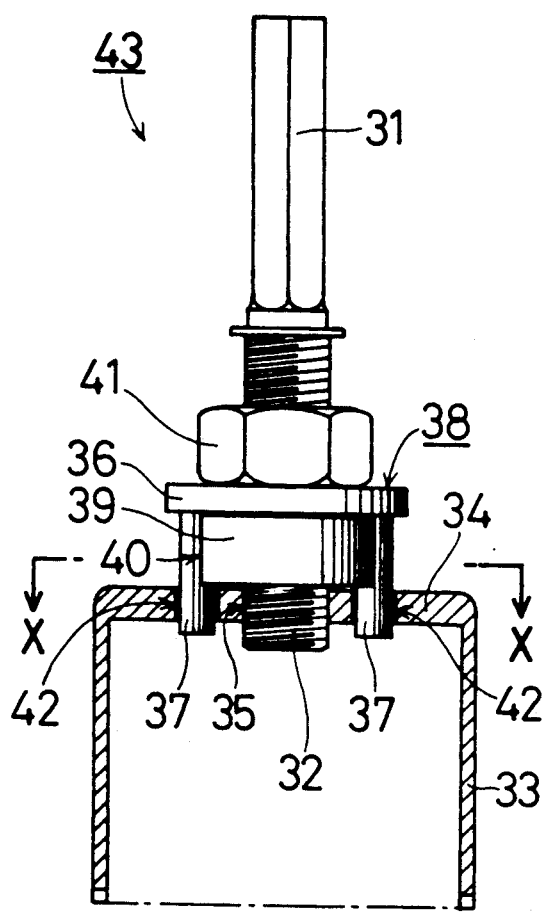
FIG. 9 is a front view, partially in longitudinal section, showing one prior art hole saw.

In the foregoing embodiment, the holes 19 and 20 are both formed as threaded holes in order to enable the pin 5 and the bolt 6 to be adjusted by either one of the two holes 19, 20. In another embodiment, the one hole 19 may be a hole having no internal thread, and the other hole 20 only may be formed as a threaded hole (see FIG. 8). In a further embodiment, the arrangement may be such that the drive collar 3 of the shank 1 is not provided with the pin 5, and the hole saw body 15 is not formed with the hole 19.

In the foregoing embodiment, a double-edged hole saw body 15 is removably mountable to the shank 1, and therefore the drive collar 3 at the front end of the shank 1 is formed as a stepped drive collar 3 consisting of a large-diameter disc-shaped portion 3a and a smaller-diameter cylindrical portion 3b. However, in the case where the hole saw body to be mounted to the shank 1 is a single-edged hole saw body 15' having a cylindrical saw tooth element 17' formed on only one side of the base 16 perpendicular to the axis of the hole saw body, the drive collar 3' many not necessarily be a stepped drive collar (see FIG. 8)

Where the hole saw body 15 to be mounted to the shank is a double-edged one as in the above described embodiment, the drive collar 3 formed as a stepped drive collar 3 having a small-diameter portion at the front side and a large-diameter portion at the base side permits the unused one of the saw tooth elements 17 to be covered by the large diameter portion 3a. Thus, the operator can be safely protected from danger by means of the large-diameter portion 3a.

ADVANTAGE OF THE INVENTION

As may be apparent from the foregoing description, the hole saw and in particular, the shank and hole saw body as components thereof, are such that after the cylindrical boss formed centrally of the front end portion of the shank is inserted into the center hole formed centrally of the base of the hole saw body, the hole saw body can be securely mounted to or removed from the shank simply by unscrewing or screwing the bolt received in the bolt receiving through-hole of the drive collar into or from the threaded hole of the base of the hole saw body. Therefore, the hole saw of the invention affords simple and easy operation for mounting and removal of the hole saw body to and from the shank.

Furthermore, according to the invention, the hole saw body is mountable to and removable from the shank without the hole saw body being screwed or screwed back relative to the shank as required in the case of the prior art hole saw referred to in the beginning of this specification, simply by inserting or removing the boss of the shank into or from the center hole of the hole saw body. Therefore, the hole saw of the invention enables the operation of such mounting and removal to be carried out very safely.

Additionally, the hole saw of the invention is of such arrangement that when the hole saw body has been mounted to the shank, the base of the hole saw body is kept in close contact with the drive collar of the shank, and such condition of contact is established by positive clamping effect through thread engagement between the bolt and the threaded hole. Therefore, the hole saw of the invention is free from the possibility of such looseness of the hole saw body in the direction of rotation thereof and of such wobbling of the axis of the hole saw body relative to the axis of the shank as have been seen with the prior art hole saw as referred to earlier. Accordingly, even where ultrahard chips are used for the tooth section of the hole saw body, the hole saw of the invention can be employed without damage being caused to such chip due to the vibration of the hole saw body.

WHAT IS CLAIMED IS:

1. A hole saw including in combination a shank having a drive collar at the front end of a drive shaft, a hole saw body having a base perpendicular to the axis thereof, and mounting means for removably attaching the base of the hole saw body to the drive collar of the shank, said hole saw comprising:
   a. said drive collar of the shank being formed substantially integrally with the drive shaft;
   b. a cylindrical boss projecting from the front side of said drive collar and having a diameter smaller than said drive collar and coaxial with the shank, said drive collar having a bolt receiving through-hole bored therein at a position radially spaced from said boss which is parallel to the axis of the shank;
   c. a bolt received in said bolt receiving through-hole, said bolt having a length such that a threaded portion of the bolt projects beyond the front side of the drive collar when the bolt is inserted into the bolt receiving through-hole until its head engages the rear side of the drive collar;
   d. the base of said hole saw body having a center hole bored centrally therein for receiving the boss projecting from the front side of said drive collar, said base further having at least one threaded hole bored therein at a position radially spaced from said center hole for receiving the threaded portion of the bolt extending through said bolt receiving through-hole;
   e. whereby, when said center hole in the base of the hole saw body is engaged by said boss projecting from the front side of the drive collar and when the threaded portion of the bolt received in the bolt receiving through-hole of the drive collar is brought in thread engagement with said threaded hole in the base of the hole saw body, said base of the hole saw body goes in close contact with the front side of the drive collar so that the hole saw body can be firmly retained in position by the drive collar.

2. A hole saw as defined in claim 1, further comprising a pin projecting from the front side of said drive collar at a position symmetrical about the axis of the shank with that of said bolt projecting beyond the front side of said drive collar, said pin having a diameter suited to enable said pin to be received in said threaded hole, said threaded hole being provided in one pair in the base of said hole saw body at positions symmetrical about said center hole.

3. A hole saw as defined in claim 1 or 2, wherein a stop ring is suitably fitted on said drive shaft for preventing the bolt received in said bolt receiving through-hole of the drive collar from slipping off said through-hole.

4. A shank for a hole saw comprising a drive collar having a larger diameter than a drive shaft and formed integrally with the drive shaft, a cylindrical boss projecting from the front side of said drive collar and of a smaller diameter than said drive collar and coaxial with the shank and for receiving thereon an aperture in a hole saw body, said drive collar having a bolt receiving through-hole bored therein at a position radially spaced from said boss which is parallel to the axis of the shank, and a bolt received in said bolt receiving through-hole for attaching a hole saw body, said bolt having a length such that a threaded portion of the bolt projects beyond the front side of the drive collar when the bolt is inserted into the bolt receiving through-hole until its head engages the rear side of the drive collar.

5. A shank for a hole saw as defined in claim 4, further comprising a pin projecting from the front side of said drive collar at a position symmetrical about the axis of the shank with that of said bolt projecting beyond the front side of said drive collar, said pin having an outer diameter suited to enable said pin to be received in a threaded hole for receiving said bolt.

6. A shank for a hole saw as defined in claim 4 or 5, wherein a stop ring is suitably fitted on said drive shaft for preventing the bolt received in said bolt receiving through-hole of the drive collar from slipping off said through-hole.

7. A hole saw body having a base perpendicular to its axis, comprising a center hole bored centrally in said base which is coaxial with said axis, and at least one threaded hole bored in said base at a position radially spaced apart from said center hole, said threaded hole being parallel to said axis.

8. A hole saw body as defined in claim 7, wherein said threaded hole is provided in one pair in said base of the hole saw body at positions symmetrical about said center hole.

* * * * *